Oct. 24, 1967  D. C. EISENDRATH  3,348,468
COFFEE BREWER
Filed Sept. 30, 1965  2 Sheets-Sheet 1

INVENTOR.
David C. Eisendrath,
BY
Hofgren, Wegner, Allen,
Stellman & McCord Attys.

Oct. 24, 1967  D. C. EISENDRATH  3,348,468
COFFEE BREWER
Filed Sept. 30, 1965  2 Sheets-Sheet 2
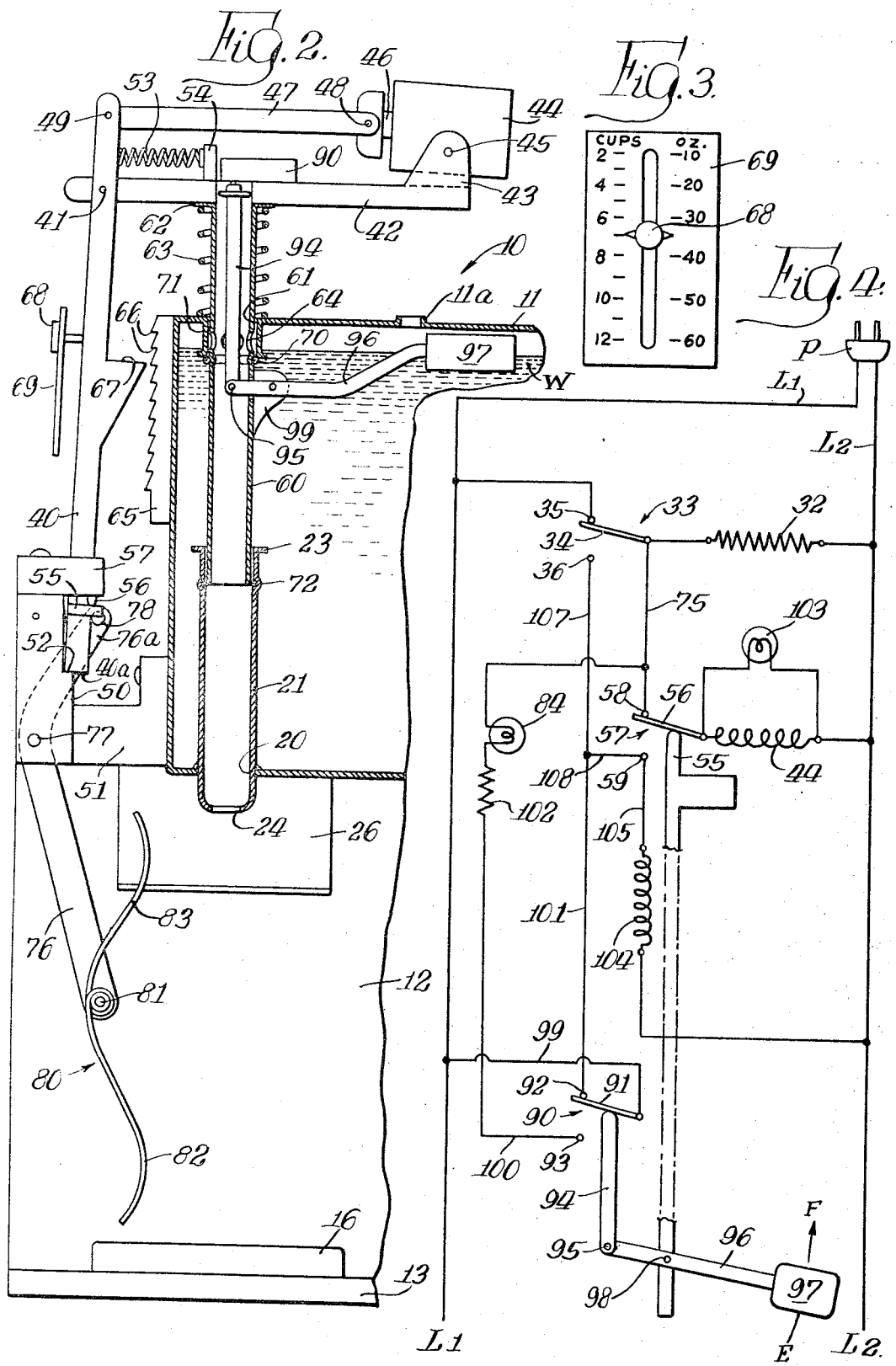

United States Patent Office 3,348,468
Patented Oct. 24, 1967

3,348,468
COFFEE BREWER
David C. Eisendrath, Chicago, Ill., assignor to Cory Corporation, a corporation of Delaware
Filed Sept. 30, 1965, Ser. No. 491,681
17 Claims. (Cl. 99—282)

This invention relates to brewing apparatus, and more particularly to apparatus for brewing beverages such as coffee and the like.

Conventional beverage brewing apparatus has heretofore included relatively complex mechanical structure, as well as relatively complex control devices for controlling the brewing of the beverage. Such apparatus have in general proven unsatisfactory because of their high initial manufacturing cost, and also because of their relatively high maintenance cost when in use. Accordingly, there has been a long felt need for brewing apparatus which is efficient in operation, yet simple in construction and relatively inexpensive to manufacture and maintain. The present invention comprehends an improved brewing apparatus which fulfills this need by providing a relatively simple yet novel brewing structure which overcomes the disadvantages of the known devices, and by providing novel control means for such apparatus.

A principal feature of the invention, therefore, is to provide a new and improved brewing apparatus.

Another feature of the invention is to provide such brewing apparatus having novel means for preventing the actuation of manually operable volume selector means thereof until the beverage reaches a preselected temperature level.

Another feature of the invention is the provision of such brewing apparatus having new and improved means for preventing a brewing cycle until the container into which the brewed beverage is to be dispensed is associated with the brewing apparatus.

Still another feature of the invention is the provision of such brewing apparatus having means responsive to the level of fluid within a heating tank to allow cold brewing fluid to flow into the tank when the level of fluid within the tank reaches a preselected level.

A still further feature of the invention is the provision of such brewing apparatus with new and improved means for preventing the termination of a brewing cycle until until the preselected quantity of fluid has been discharged from a heating tank.

Still another feature of the invention is the provision of brewing apparatus having movable fluid outlet means for selecting a quantity of fluid and latch means for latching the outlet means in a selected position with means for releasing the latch means in response to the discharge of the selected quantity of fluid.

Yet another feature of the invention is the provision of means for preventing the initiation of a brewing cycle until the level of liquid in the brewing apparatus reaches a predetermined "full" level.

Other features of the invention will be apparent from the following description taken in connection with the accompanying drawing, wherein:

FIG. 2 is a fragmentary view similar to FIG. 1, but showing the apparatus prior to the initiation of a brewing cycle;

FIG. 3 is a front elevational view of a volumetric selecting indicator used in connection with the apparatus shown in FIGS. 1 and 2; and FIG. 4 is a schematic electrical diagram illustrating the means for controlling the operation of the brewing apparatus of the present invention with certain mechanical elements being shown diagrammatically.

Figure 1:
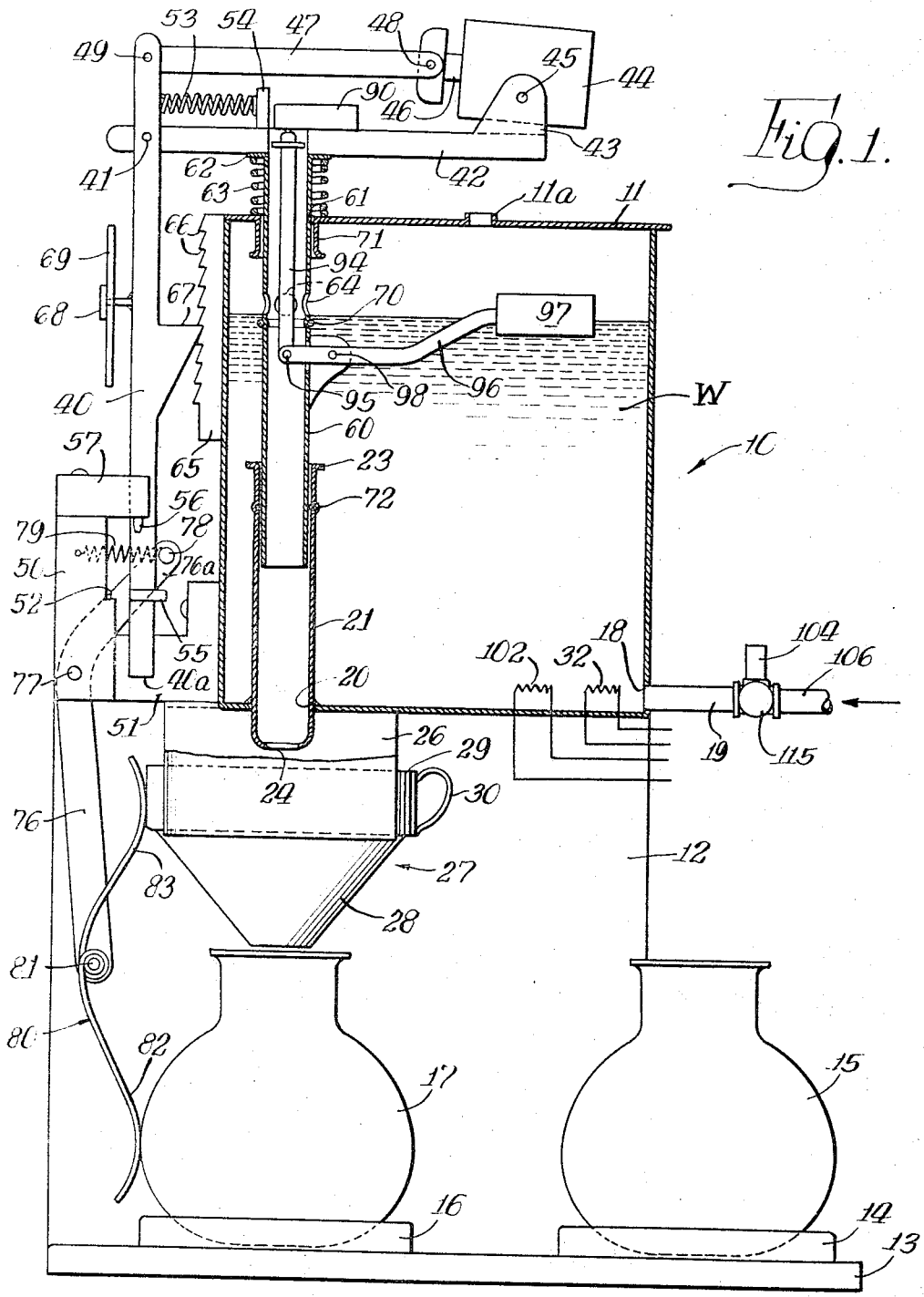
FIG. 1 is a side elevation, partly in section, illustrating a preferred embodiment of the invention after a selected quantity of water has been discharged from a storage tank.

In the illustrative embodiment of the drawing, wherein like reference numerals designate like, or corresponding, parts throughout the several views, a beverage brewing apparatus generally designated 10 is shown to comprise a hot water supply tank 11 fixed on an upright 12 that extends upwardly from a suitable stand 13. Stand 13 includes a platform 14 which defines a serving station for reception of a conventional upwardly open decanter 15. Stand 13 also is provided with a platform 16 that defines a brewing station for reception of an upwardly open decanter 17. Tank 11 includes a cold water inlet opening 18 which communicates with a pressurized water supply line 19 for providing a supply of water W for the tank 10. The control of the water inlet supply will be hereinafter explained in detail. Tank 11 also includes a hot water outlet opening 20 in the bottom wall thereof which is positioned in vertical alignment with the aforementioned brewing station. A hot water discharge tube 21 is fixed in the outlet opening 20, and is provided with an open, flanged upper end 23, with a discharge opening 24 being provided in the lower portion thereof. A suitable vent opening 11a is provided in the uper end of tank 11.

A bracket 26 is fixed to the undersurface of the tank 10 for reception of a brewing cartridge 27 (FIG. 1). Cartridge 27 is conventional in form, and includes a generally frusto-conically shaped lower portion 28 that includes a filter, not shown, at the lower portion thereof, and a brewing beverage such as coffee therein. Cartridge 27 includes a generally cylindrical upper portion 29, for a purpose to hereafter appear. A handle 30 may be affixed to cylindrical cartridge portion 29 to facilitate the handling thereof. As can be best seen in FIG. 1, the upper portion of the cartridge 27 is positioned in alignment with the discharge opening 24 of hot water discharge tube 21, so that the hot water discharged from the tank 10 will flow through the cartridge 27 to brew the beverage. The discharge opening at the lower portion of the cartridge 27 is positioned in alignment with decanter 17 on the brewing station, so that the brewed beverage will be discharged into decanter 17.

The means for heating the water W in tank 10 include a heating coil 32 of conventional design (FIG. 4) which is disposed in the lower portion of the tank, as is well known in the art. The operation of heating coil 32 is controlled by a thermostat, not shown, which operates a suitable snap action switch 33 (FIG. 4) in response to changes in the temperature of the water within tank 11. When the water within tank 11 is cold, the movable switch arm 34 is positioned against a contact 35 to complete a circuit to the heating coil 32, whereas when the water within the tank 10 is hot, the thermostat operates to move the switch arm 34 into engagement with the conact 36 to open the circuit to the heating coil 32.

The means for selecting the quantity of hot water to be discharged from tank 10 includes a manually operable lever 40 which is pivoted at 41 to a vertically movable platform 42. A tubular, vertically movable standpipe 60 is received in hot water discharge tube 21, and extends upwardly and outwardly through an opening 61 in the top wall of the tank. The upper end of standpipe 60 is provided with an outwardy directed flange 62 which is fixed to the undersurface of platform 42. A helical spring 63 surrounds the upper portion of standpipe 60, and bears against the upper wall of the tank 11 and flange 62 to urge the platform 42 and the standpipe 60 upwardly. Standpipe 60 is provided with a plurality of openings 64 intermediate the ends thereof, which are movable to a position below the level of water within tank 11 to discharge a preselected quantity of water through the standpipe 60 and outwardly of the tank 11 through the discharge tube 21.

Means are provided for positioning the standpipe openings 64 at a desired depth below the level of water within tank 11 corresponding to the amount of water to be discharged from the tank and for retaining standpipe 60 in this position. This means include a rack 65 carried by the side of the tank 11 and having a plurality of vertically spaced teeth 66, each tooth corresponding to an amount of water to be discharged from the tank 11. Lever 40 is provided with a pawl 67 facing the rack 65, which is selectively engageable with one of the teeth 66 by manual movement of the lever 40 to select the amount of water to be discharged from the tank 11. A handle 68 may be provided for manual manipulation of lever 40, and an indicator plate 69 may be fixed on an enclosure (not shown) for the brewing apparatus to give a visual indication of the quantity of water which has been selected for discharge from the tank 11. A first O-ring 70 is mounted on movable standpipe 60 in a circumferential groove below openings 64, and is engageable with the inner diameter of a fixed standpipe 71 extending downwardly from opening 61 to provide a seal therebetween when the platform 42 is in the upper position shown in FIG. 2 to prevent water which is entering the tank from flowing outwardly of the tank through openings 64. A second O-ring 72 is provided in a circumferential groove in the inner diameter of discharge tube 21, and sealingly engages the lower portion of the movable standpipe 60 to prevent water from escaping around the outer diameter of the standpipe 60.

Means are provided for preventing the actuation of the volume selecting means until the water in tank 11 is hot, and includes a solenoid 44 pivotally mounted at 45 on an upstanding bracket 43 carried by platform 42. The plunger 46 of solenoid 44 is pivotally connected at 48 to one end of a link 47, whose opposite end is pivotally connected to the upper end of lever 40 at 49. An upright 50 is held in spaced relation with respect to tank 11 adjacent the lower portion thereof by a suitable bracket 51, and upright 50 includes a step or shoulder 52 at an intermediate portion thereof facing tank 11. A spring 53 extends between the upper portion of lever 40 and an upstanding lug 54 on platform 42 to bias the lever 40 in a counterclockwise direction about pivot 41. Thus, when tank 11 is substantially full of water (FIG. 2) and plug P (FIG. 4) is inserted into a suitable electric outlet, a circuit is completed to heater 32 through line L–1, contact 35, and switch arm 34; and a circuit is completed to solenoid 44 through line L–1, contact 35, switch arm 34, line 75 and a limit switch 57 to be hereafter described to energize the solenoid 44. Energization of solenoid 44 retracts plunger 46 to pivot lever 40 in a clockwise direction about pivot 41, and as can be best seen in FIG. 2, the lowermost portion 40a of the lever 40 will be positioned on the step 52 of upright 50. Thus, until heater 32 has heated the water to a sufficient level to move the switch arm 34 from contact 35 to contact 36 via the thermostatic control, lever 40 cannot be moved downwardly so that a brewing cycle cannot be initiated until the water within tank 11 reaches a predetermined temperature. When the water in tank 11 reaches the desired temperature level, and switch arm 34 moves from contact 35 to contact 36, the circuit to solenoid 44 will be interrupted to deenergize the same, and spring 53 will pivot the lever 40 in a counterclockwise direction about pivot 41, to free the bottom portion 40a of the lever from step 52 so that the lever 40 can be manually adjusted.

Means are also provided to prevent the initiation of a brewing cycle until a cartridge 27 is mounted on bracket 26 and a decanter 17 is present on the brewing station. To this end, an arm 76 is pivotally mounted on upright 50 at 77, and includes a portion 76a extending toward the tank 11 and carrying a pin 78. Pin 78 is held in engagement with the adjacent face of lever 40 by a spring 79 which is anchored on upright 50. Spring 79 is stronger than spring 53, so that even if the solenoid 44 is deenergized, the spring 53 will not pivot the lever 40 in a counterclockwise direction about pivot 41 unless the decanter and the cartridge are in place on the brewing apparatus. A sensor member 80 is pivotally mounted on the lower end of arm 76 at 81, and includes curved portions 82 and 83 for engaging the decanter on the brewing station and the cartridge, respectively. Thus, when both the decanter 17 and the cartridge 27 are in place on the brewing apparatus, the sensor arm portion 82 will engage the decanter 17 and the sensor arm portion 83 will engage the cylindrical portion 29 of the cartridge 27 to pivot the arm 76 in a clockwise direction about pivot 77 so that spring 53 can pivot the lower portion 40a of the lever 40 off of the step 52 when the solenoid 44 is deenergized. Thus, it should be clear that a brewing cycle cannot be initiated until both the decanter 17 and the cartridge 27 are present on the brewing apparatus, and until the water in tank 11 reaches a predetermined temperature level.

A suitable snap action limit switch 57 is provided to transfer control of the latch solenoid 44 from a float switch 90, which controls the latch solenoid when the platform is in a "down" or brewing position, to the thermostatic switch 33, which controls the latch solenoid when the platform is in an "up" position. Limit switch 57 includes a switch arm 56 which is biased toward a contact 59, and which is held in engagement with a contact 58 by an abutment 55 on lever 40 when the platform is in the "up" position. When the platform is in a brewing position it is important that the latch solenoid is not controlled by the thermostatic switch 33, to prevent premature termination of the brewing cycle, as would occur if the switch arm 34 moved into engagement with contact 35.

The operation of the brewing apparatus 10 may be best understood from a consideration of the control circuit illustrated in FIG. 4. Thus, after the plug P is inserted in a suitable electric outlet and the user has installed the cartridge 27 in the bracket 26 with the grounds and filter in place within the cartridge, and placed the decanter 17 on the platform 15, a circuit is completed to heater 32 to energize solenoid 44. When the water in tank 11 reaches the preselected temperature level, as determined by the thermostatic control (not shown), the movable switch arm 34 will be moved out of engagement with contact 35 and into engagement with contact 36 to interrupt the circuit to the heater 32 and to the solenoid 44. Deenergization of the solenoid 44 will allow spring 53 to pivot lever 40 in a counterclockwise direction about the pivot 41 to free the end portion 40a of the lever 40 from step 52, and thereby allow the lever 40 to be manually adjusted. The lever 40 is moved downwardly, carrying platform 42 and standpipe 60 therewith, to a level governed by the amount of water to be discharged from tank 11, and the pawl 67 is then engaged with the appropriate tooth 66 on the rack 65. Springs 53 and 63 cooperate to retain the pawl 67 against the selected tooth. The hot water within tank 11 then begins to flow through the openings 64 and outwardly of the tank 11 through standpipe 60 and discharge tube 21 into the cartridge 27.

A suitable snap action float switch 90 is provided on platform 42, and includes a movable switch arm 91 that engages a contact 92 when the selected quantity of water has been discharged from tank 11, and which is biased into engagement with a contact 93 when the tank 11 is full. A switch actuator 94 is movable vertically within tube 60, and is pivotally secured at 95 to a float lever 96. Float lever 96 carries a suitable float member 97, and is pivotally secured at 98 to a bracket 99 on the tube 60. Thus, when the tank 11 is full, the float 97 will be in the position shown in FIG. 2, and switch arm 91 will engage contact 93. When the platform 42 is initially lowered, the float 97 will be submerged and positively urge the switch arm 91 into engagement with contact 93. When the selected quantity of water has been discharged from tank 11 to position the water level at the very latest some point above the lower edge of the inlet openings 64, the float 97 will pivot into a position shown in FIG. 4, and the switch arm 91 will engage the contact 92.

The circuitry for float switch 90 includes a line 99 connecting switch arm 91 with lead L–1, a line 100 connecting contact 93 with line 75 through "ready" light 84 and series connected resistance 102 and a line 101 connecting contact 92 with the contact 36 of thermostat switch 33. The "ready" light 84 indicates that all conditions of the brewing apparatus are set to permit the coffee to be brewed. The light 84 is subsequently deenergized when the switch arm 91 of the float switch 90 moves from contact 93 to contact 92 to interrupt the circuit to the lamp 84. It will be understood, of course, that the magnitude of resistance 102 is sufficient to limit the current flowing throught line 100 to prevent the energization of solenoid 44 when the switch arm 34 has moved into engagement with contact 36 and float switch arm 91 is positioned in engagement with contact 93. A similar indicating means in the form of a "Wait" light 103 may be connected in parallel with solenoid 44 to indicate when solenoid 44 is energized. It will be understood to those skilled in the art that one of lights 84 or 103 may be omitted if desired.

Thus, as the platform 42 is lowered to discharge the desired quantity of water, the switch arm 34 is in engagement with contact 36, the switch arm 56 is in engagement with contact 59, and the switch arm 91 is in engagement with contact 93. As the water level within the tank 11 recedes and approaches a level above the lower edge of holes 64, float 97 rotates in a clockwise direction and the switch arm 91 of the float switch 90 moves into engagement with contact 92. When the switch arm 91 is in engagement with contact 92, a circuit is completed to a cold water solenoid 104 through line L–1, line 99, switch arm 91, contact 92, line 101, line 108, line 105 and lead L–2. Solenoid 104 is operatively connected with a flow regulating valve 115 (FIG. 1), and it will be understood that when solenoid 104 is energized valve 115 opens to enable water to flow into the tank 11 from the pressurized water line 106. When the level of water in tank 11 rises to the "full" level, the float rotates in a counterclockwise direction and switch arm 91 moves from contact 92 to contact 93 to deenergize the cold water solenoid 104. At the "full" level the upper surface of the water is preferably below the lower edge of the holes 64, but if the water level rises above the lower edge of the holes 64, the O-ring 70 cooperates with standpipe 71 to prevent the incoming liquid from flowing outwardly of standpipe 60.

After the platform 42 has been depressed, and the selected quantity of water has been discharged to move the float switch arm 91 into engagement with contact 92, a circuit is completed to solenoid 44 through lead L–1, line 99, switch arm 91, contact 92, line 101, line 108, contact 59, switch arm 56, and line L–2 to energize the solenoid 44 and pivot lever 40 into a position such as that shown in FIG. 2. The spring 63 then moves the platform 42 upwardly to position the brewer elements for initiation of another brewing cycle.

A line 107 extends from contact 36, and is connected to contact 59 by a line 108. Thus, when the float switch arm 91 is in engagement with contact 92 to energize cold water input solenoid 104, the energization of the heating element 32 will be insured, since a circuit will be complete to the heating element from lead L–1, line 99, switch arm 91, contact 92, line 101, line 107, contact 36, switch arm 34, and lead L–2 if the water in the tank 11 is still hot enough to prevent the thermostat switch from moving switch arm 34 to contact 35; but if the water in the tank 11 has cooled sufficiently to move the switch arm 34 into engagement with contact 35, the heating element 32 will be energized through the switch 33. From the foregoing it will be apparent that line 107 insures that the latch solenoid 44 will be energized after the termination of a brewing cycle so that an operator cannot prematurely initiate a new brewing cycle before the switch arm 34 has moved into engagement with contact 35 or before arm 91 hits contact 93 indicating a full tank. However, line 107 may be omitted, if desired, since it is possible that a sufficient amount of water could evaporate from the tank 11 so that the float switch arm 91 could move into engagement with contact 92, and in this event the water within tank 11 would be rapidly boiled off.

It should also be noted that the resistance 102 which is provided in series with the "ready" light 84 may take the form of a heating element, and be positioned in the bottom of the tank 11, as is shown in FIG. 1. In this event, standby heating means would be provided for the water within the tank 11 whenever the float switch arm 91 engages contact 93.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. Brewing apparatus comprising:
   a tank for holding liquid;
   outlet means movable mounted in said tank;
   manually operable means for moving said outlet means in said tank from a set position wherein the outlet means is out of communication with liquid in the tank to any one of a plurality of selectable positions below the upper level of liquid for discharging any one of a plurality of different quantities of liquid from said tank;
   means biasing said outlet means toward said set position;
   latch means for locking said outlet means in the selected position;
   and means for releasing said latch means as a result of the selected quantity of liquid being discharged from said tank.

2. The brewing apparatus of claim 1 further including means for heating the liquid in the tank to a hot temperature, and means for preventing operation of said manually operable means until the liquid in said tank reaches said hot temperature.

3. The brewing apparatus of claim 1 further including means for sensing the presence of a container in association with said brewing apparatus, and means for preventing operation of said manually operable means until the presence of said container is sensed.

4. The brewing apparatus of claim 1 further including means for heating the liquid in the tank to a hot temperature; means for sensing the presence of a container in association with said brewing apparatus; means for preventing operation of said manually operable means until the presence of said container is sensed; and means for preventing operation of said manually operable means until the liquid in said tank reaches said hot temperature.

5. The brewing apparatus of claim 1 wherein said tank includes fluid inlet and fluid outlet openings therein; said outlet means includes guide means surrounding said outlet opening, a standpipe movably mounted in said guide means and having an opening therein, manually operable means for moving the standpipe from a set position wherein the standpipe opening is above the level of liquid in the tank to one of a plurality of selectable positions wherein the standpipe opening is below the level of liquid in said tank for discharging said selected quantity of liquid through said guide means and from said tank through said fluid outlet opening, means biasing said standpipe toward said set position, and latch means for locking said standpipe in the selected position.

6. The brewing apparatus of claim 5 wherein said guide means comprises a tubular member fixed in said outlet opening.

7. The brewing apparatus of claim 5 further including liquid supply means communicating with said liquid inlet opening for delivering liquid to said tank, and means for preventing flow of liquid into said tank from said supply means until said selected quantity of liquid has been discharged therefrom.

8. The brewing apparatus of claim 1 wherein said biasing means comprises means biasing the means for moving said outlet means toward said set position.

9. Brewing apparatus comprising:
a tank having a hot liquid outlet;
a beverage cartridge adapted to receive the flow of hot liquid from said outlet for brewing of beverage therein and discharge of the brewed beverage into a container;
means for heating said liquid;
manually operable means for selecting a quantity of hot liquid to be discharged from said tank;
latch means for preventing the actuation of said last named means until the liquid in said tank reaches a predetermined temperature;
and means responsive to the attainment of said predetermined liquid temperature to release said latch means and free said manually operable means for manual operation.

10. The brewing apparatus of claim 9 wherein the fluid tank further includes a cold fluid inlet and valve means for normally closing said fluid inlet, and further including means responsive to the discharge of said selected quantity of liquid to open said valve means to allow cold liquid to flow into said tank.

11. The brewing apparatus of claim 10 wherein means are further provided for sensing the filling of said tank to close said valve means.

12. The brewing apparatus of claim 1 wherein said latch means includes first means for preventing the actuation of said manually operable means until the liquid in said tank reaches a predetermined temperature, means responsive to the attainment of said predetermined liquid temperature to release said first means and free said manually operable means for manual operation, resilient means urging said manually operable means toward said set position, and second means for retaining said manually operable means in the selected position.

13. The brewing apparatus of claim 12 wherein means responsive to the movement of said manually operable means are provided to prevent release of said second means until the liquid in said tank reaches a predetermined level.

14. The brewing apparatus of claim 12 wherein said manually operable means includes movable conduit means communicating with said hot liquid outlet and having at least one opening movable below the level of liquid in said tank to allow the selected quantity of liquid to flow outwardly from said tank through said conduit means.

15. Brewing apparatus comprising:
a support;
a tank carried by said support and having a hot liquid outlet;
a beverage cartridge adapted to receive the flow of hot liquid from said outlet for brewing beverage therein and discharge of the brewed beverage into a container;
means for heating said liquid;
a lever pivotally mounted on said support for movement between first and second positions, said lever being manually movable in said second position from a set position to any one of a plurality of selectable positions to select a quantity of hot liquid to be discharged from said tank;
conduit means movable with said lever and communicating with said hot liquid outlet, said conduit means having at least one opening movable from a position above an upper level of said liquid to a position below said upper level of said liquid to discharge said selected quantity of liquid from said tank;
first latch means for preventing the movement of said lever from said first to said second position until the liquid in said tank reaches a predetermined temperature;
means responsive to the attainment of said predetermined liquid temperature to pivot said lever from said first to said second position and release said first latch means and free said lever for manual operation;
resilient means urging said lever toward said set position;
second latch means for holding said lever in the selected position;
means responsive to the discharge of the selected quantity of liquid for releasing said second latch means to free said lever for movement toward the set position under the urging of said resilient means;
and means responsive to movement of said lever into said set position to actuate said first latch means, pivot said lever, and latch the same in said first position.

16. Brewing apparatus comprising:
a support;
means on said support for holding a container;
means on said support for holding a beverage cartridge in alignment with said container for discharging brewed beverage from the beverage cartridge into said container;
a tank carried by said support and having a hot liquid outlet arranged to discharge hot liquid from said tank into said cartridge;
means for heating said fluid;
manually operable means for selecting a quantity of hot liquid to be discharged from said tank;
means responsive to the absence of either said cartridge or container for preventing actuation of said manually operable means and responsive to the presence of both said cartridge and container on said support means for allowing the actuation of said manually operable means.

17. The brewing apparatus of claim 16 wherein said sensing means includes a link pivotally mounted on said support and carrying a first feeler positioned for engagement with said cartridge and a second feeler positioned for engagement with said container.

References Cited
UNITED STATES PATENTS

| | | | |
|---|---|---|---|
| 590,626 | 9/1897 | Pardo | 99—283 |
| 1,506,712 | 8/1924 | McAllen | 99—283 |
| 3,016,930 | 1/1962 | Dziedzivla | 99—282 X |
| 3,034,417 | 5/1962 | Bunn | 99—283 |
| 3,179,035 | 4/1965 | Lockett | 99—283 X |
| 3,232,212 | 2/1966 | Karlen et al. | 99—283 |

WILLIAM I. PRICE, *Primary Examiner.*

R. JENKINS, *Assistant Examiner.*